United States Patent
Liu et al.

(10) Patent No.: US 8,216,540 B2
(45) Date of Patent: *Jul. 10, 2012

(54) METHOD FOR MAKING CARBON NANOTUBE FILM

(75) Inventors: Chang-Hong Liu, Beijing (CN); Shou-Shan Fan, Beijing (CN)

(73) Assignees: Beijing FUNATE Innovation Technology Co., Ltd., Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/590,305

(22) Filed: Nov. 5, 2009

(65) Prior Publication Data

US 2010/0055024 A1    Mar. 4, 2010

Related U.S. Application Data

(63) Continuation of application No. 12/005,828, filed on Dec. 28, 2007, now Pat. No. 7,641,885.

(30) Foreign Application Priority Data

Jun. 1, 2007    (CN) .......................... 2007 1 0074699

(51) Int. Cl.
  *D01C 5/00*   (2006.01)
  *B32B 9/00*   (2006.01)
  *B01J 19/08*  (2006.01)
  *D01F 9/12*   (2006.01)

(52) U.S. Cl. ..................... 423/447.3; 428/408

(58) Field of Classification Search ............. 257/E51.04; 423/447.3; 428/408
  See application file for complete search history.

(56) References Cited

U.S. PATENT DOCUMENTS

2004/0053053 A1    3/2004    Jiang et al.
2005/0238565 A1    10/2005   Sullivan
2007/0237959 A1    10/2007   Lemaire

FOREIGN PATENT DOCUMENTS

TW    246503    1/2006

*Primary Examiner* — Jessica L Ward
*Assistant Examiner* — Alexander Polyansky
(74) *Attorney, Agent, or Firm* — Altis Law Group, Inc.

(57) ABSTRACT

The present invention relates to a method for making a carbon nanotube film. The method includes the following steps. An array of carbon nanotubes is formed on a substrate. The array of carbon nanotubes is pressed by a pressure head to form a carbon nanotube film having properties identical in all directions parallel to a surface of the carbon nanotube film.

13 Claims, 5 Drawing Sheets

--- forming an array of carbon nanotubes on a substrate

↓ pressing the array of carbon nanotubes using a compressing apparatus, thereby forming a carbon nanotube film.

METHOD FOR MAKING CARBON NANOTUBE FILM

RELATED APPLICATIONS

This application is a continuation application of U.S. patent application Ser. No. 12/005,828, filed Dec. 28, 2007, entitled, "METHOD FOR MAKING A CARBON NANOTUBE FILM".

BACKGROUND

1. Field of the Invention

The invention generally relates to a method for making a carbon nanotube film.

2. Discussion of Related Art

Carbon nanotubes (CNTs) produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). CNTs are electrically conductive along their length, chemically stable, and capable, individually, of having a very small diameter (much less than 100 nanometers) and large aspect ratios (length/diameter). Due to these and other properties, it has been suggested that CNTs can play an important role in various fields, such as field emission devices, new optic materials, sensors, soft ferromagnetic materials, etc.

Carbon nanotube film has been found especially useful in field emission electron sources, photoelectric and biological sensors, transparent electrical conductors, battery electrodes, absorbing materials, water purification materials, light emitting material, and related devices. Thus, methods for making carbon nanotube film have become the basis for applications in the above-described fields. Currently, carbon nanotube films can be made by a method of direct growth.

Carbon nanotube film can also be made by methods using carbon nanotube powders, such as a dropping and drying solvent method, a Langmuir-Blodgett (L-B) method, a printing method, an electrophoresis method, a membrane filter method, etc. However, the above-described methods generally have complicated fabrication procedures. Thus, in use, such methods have proven less efficient than truly desirable. Furthermore, the carbon nanotube films produced by the above-described methods have poor tensile strength and/or toughness. Thus, the carbon nanotube films are susceptible to fracturing.

What is needed, therefore, is a method for making a carbon nanotube film, which is simple and efficient at making carbon nanotube film with good tensile and mechanical strength.

BRIEF DESCRIPTION OF THE DRAWINGS

Many aspects of the present method for making a carbon nanotube film can be better understood with reference to the following drawings. The components in the drawings are not necessarily to scale, the emphasis instead being placed upon clearly illustrating the principles of the present method for making a carbon nanotube film.

Figure 1:
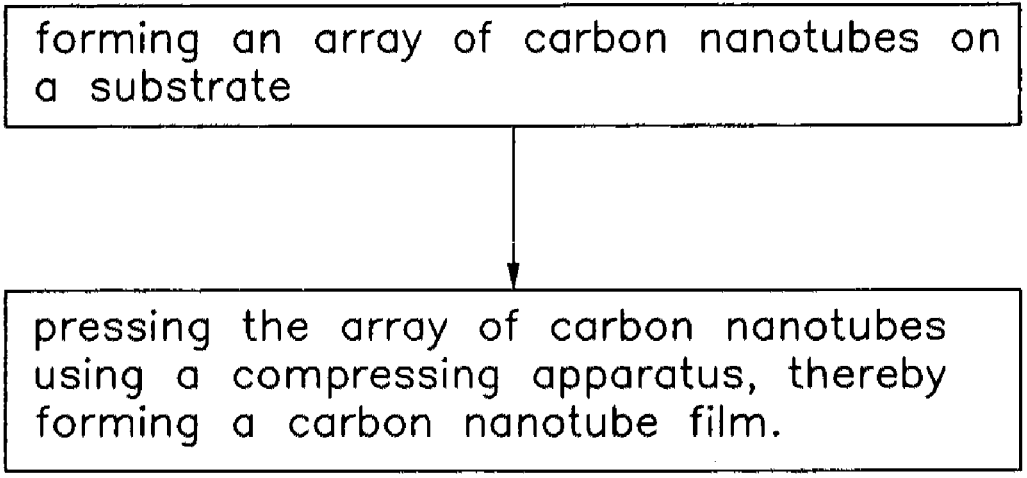
FIG. 1 is a flow chart of a method for making a carbon nanotube film in accordance with the present embodiment.

Corresponding reference characters indicate corresponding parts throughout the several views. The exemplifications set out herein illustrate at least one present embodiment of the method for making the carbon nanotube film, in at least one form, and such exemplifications are not to be construed as limiting the scope of the invention in any manner.

DETAILED DESCRIPTION OF PREFERRED EMBODIMENTS

Reference will now be made to the drawings, in detail, to describe embodiments of the method for making the carbon nanotube film.

Referring to FIG. 1 a method for making a carbon nanotube film is provided in the present embodiment. The method includes the steps of: (a) forming an array of carbon nanotubes on a substrate; and (b) pressing the array of carbon nanotubes using a compressing apparatus, thereby forming a carbon nanotube film.

In step (a), an array of carbon nanotubes, quite suitably, a super-aligned array of carbon nanotubes is provided. The given super-aligned array of carbon nanotubes can be formed by the steps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing a super-aligned array of carbon nanotubes on the substrate.

In step (a1), the substrate can, beneficially, be a P-type silicon wafer, an N-type silicon wafer, or a silicon wafer with a film of silicon dioxide thereon. Preferably, a 4-inch P-type silicon wafer is used as the substrate.

In step (a2), the catalyst can, advantageously, be made of iron (Fe), cobalt (Co), nickel (Ni), or any alloy thereof.

In step (a4), the protective gas can, beneficially, be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, have a height above 100 micrometers and include a plurality of carbon nanotubes parallel to each other and approximately perpendicular to the substrate. Because the length of the carbon nanotube array is very long, portions of the carbon nanotubes are bundled together. Moreover, the super-aligned array of carbon nanotubes formed under the above conditions is essentially free of impurities such as carbonaceous or residual catalyst particles. The carbon nanotubes in the super-aligned array are closely packed together by the van der Waals attractive force.

Figure 2:
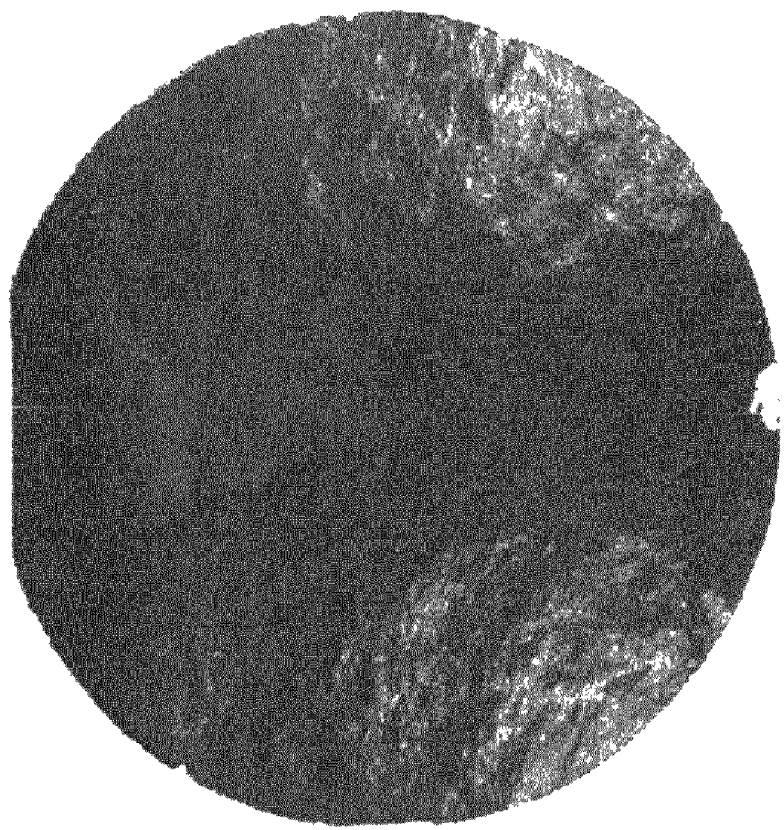
FIG. 2 shows a Scanning Electron Microscope (SEM) image of the carbon nanotube film formed by the method of FIG. 1.

In step (b), a certain pressure can, beneficially, be applied to the array of carbon nanotubes by the compressing apparatus. The carbon nanotubes in the array of carbon nanotubes form the carbon nanotube film under pressure. Referring to FIG. 2, the diameter of the carbon nanotube film is about 10 centimeters. Quite suitably, the carbon nanotubes are nearly all parallel to a surface of the carbon nanotube film.

Figure 3:
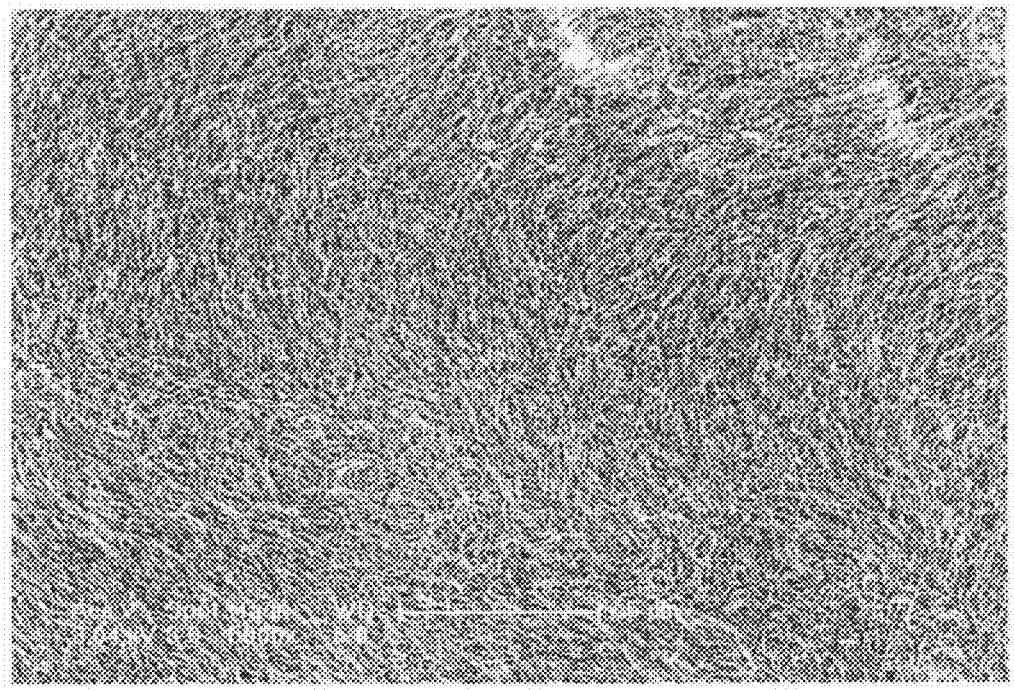
FIG. 3 shows a Scanning Electron Microscope (SEM) image of a carbon nanotube film including isotropically arranged carbon nanotubes formed by the method of FIG. 3.
Figure 4:
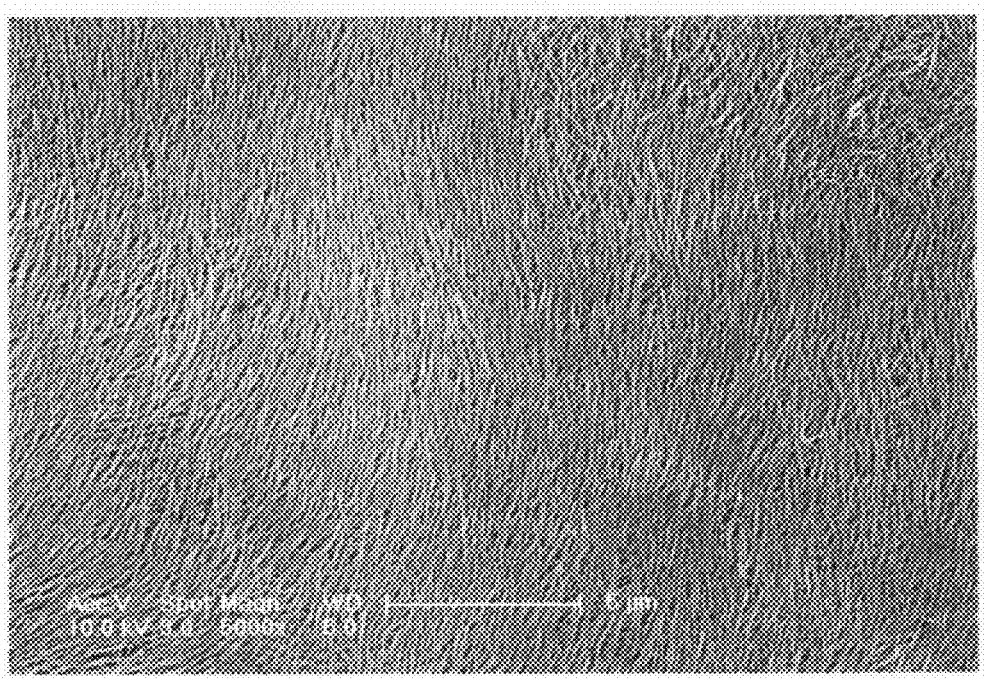
FIG. 4 shows a Scanning Electron Microscope (SEM) image of a carbon nanotube film formed by the method of FIG. 1 wherein the carbon nanotube film has a preferred orientation.
Figure 5:
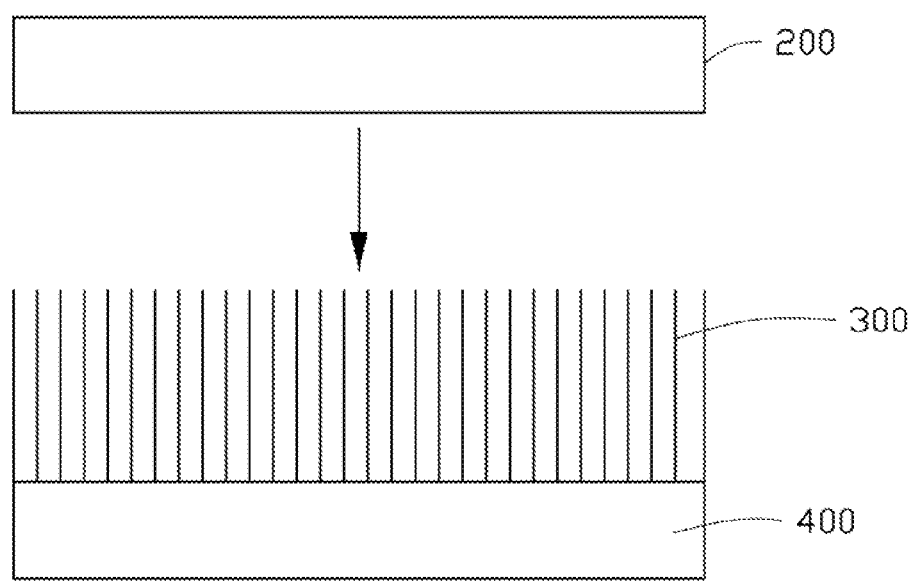
FIG. 5 is a schematic structural view of one embodiment of a method for making a carbon nanotube film using a pressure head.

In the present embodiment, the compressing apparatus can, advantageously, be a pressure head. The pressure head has a glossy surface. It is to be understood that, the shape of the pressure head and the pressing direction can, opportunely, determine the orientation of the carbon nanotubes arranged therein. Specifically, referring to FIG. 3 and FIG. 5, when a planar pressure head 200 is used to press the array of carbon nanotubes 300 along a direction indicated by the arrow shown in FIG. 5 perpendicular to the substrate 400, a carbon nanotube film having a plurality of isotropically arranged carbon nanotubes as shown in FIG. 3 can, advantageously, be obtained. Referring to FIG. 4, when a roller-shaped pressure head is used to press the array of carbon nanotubes along a fixed direction, a carbon nanotube film having a plurality of carbon nanotubes aligned along the fixed direction is obtained. When a roller-shaped pressure head is used to press the array of carbon nanotubes along different directions, a carbon nanotube film having a plurality of carbon nanotubes aligned along different directions is obtained.

Understandably, in the process of pressing, the carbon nanotubes will, beneficially, slant, thereby forming a carbon nanotube film having a free-standing structure. The carbon nanotubes in the free-standing structure are nearly all parallel to a surface of the carbon nanotube film, and isotropically arranged, arranged/aligned along a fixed direction, or arranged/aligned along different directions.

It is to be understood that, a degree of the slant of the carbon nanotubes in the carbon nanotube film is related to the pressure. The larger the pressure, the larger the degree of slant. A thickness of the carbon nanotube film is opportunely determined by the height of the carbon nanotube array and the pressure. That is, the greater the height of the carbon nanotube array and the less the pressure, the greater the thickness of the carbon nanotube film. In the present embodiment, a thickness of the carbon nanotube film is in an approximate range from 1 micrometer to 1 millimeter.

Compared with conventional methods for making carbon nanotube films, the method in the present embodiments employs a compressing apparatus to press the carbon nanotube array to obtain the carbon nanotube film thereby having the following qualities. Firstly, the carbon nanotube array includes a plurality of carbon nanotubes dispersed uniformly. Thus, the carbon nanotube film obtained by using the compressing apparatus includes a plurality of carbon nanotubes dispersed uniformly, thereby enhancing the tensile strength and mechanical strength of the carbon nanotube film. Secondly, the method is simple and efficient. Thirdly, based on differences of the shape of the compressing apparatus and the pressing direction, the carbon nanotube film includes a plurality of carbon nanotubes isotropically arranged, arranged along a fixed direction, or arranged along different directions.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for making a carbon nanotube film, the method comprising the steps of:
   providing an array of carbon nanotubes on a substrate and a pressure head, wherein the array of carbon nanotubes comprises a plurality of carbon nanotubes, each of the plurality of carbon nanotubes comprises a first end in contact with the substrate, and a second end away from the substrate; and
   pressing the array of carbon nanotubes with the pressure head along different directions, until substantially all of carbon nanotubes which are located between the substrate and the pressure head are permanently deformed and angled away from their original positions and towards the substrate, wherein the plurality of carbon nanotubes are arranged along different directions after pressing.

2. The method of claim 1, wherein during the pressing, the pressure head comes into contact with the array of carbon nanotubes at a side different than the substrate, wherein the pressing will decrease the thickness of the carbon nanotube array.

3. The method of claim 1, wherein the carbon nanotube film has a free-standing structure.

4. The method of claim 1, wherein a thickness of the carbon nanotube film is in an approximate range from about 1 micrometer to about 1 millimeter.

5. The method of claim 1, wherein providing the carbon nanotube array on a substrate comprises the following steps of:
   providing a substantially flat and smooth substrate;
   applying a catalyst layer on the substrate;
   annealing the substrate with the catalyst layer in air at a temperature in the approximate range from 700° C. to 900° C. for about 30 to 90 minutes;
   heating the substrate with the catalyst layer to a temperature in the approximate range from 500° C. to 740° C. in a furnace with a protective gas therein; and
   supplying a carbon source gas to the furnace for about 5 to 30 minutes and growing a super-aligned array of carbon nanotubes on the substrate.

6. The method of claim 5, wherein a height of the array of carbon nanotubes is above 100 micrometers.

7. The method of claim 5, wherein the plurality of carbon nanotubes are parallel to each other and approximately perpendicular to the substrate.

8. A method for making a carbon nanotube film, the method comprising the steps of:
   (a) providing an array of carbon nanotubes comprising a plurality of carbon nanotubes on a substrate; and
   (b) pressing the array of carbon nanotubes along different directions, using a planar pressure head, to form the carbon nanotube film; wherein the array of carbon nanotubes comprises a plurality of carbon nanotubes parallel to each other and approximately perpendicular to the substrate, and the plurality of carbon nanotubes are arranged along different directions after pressing.

9. The method of claim 8, wherein substantially all of the plurality of carbon nanotubes in the carbon nanotube film are parallel to a surface of the carbon nanotube film.

10. The method of claim 8, wherein the carbon nanotube film has a free-standing structure.

11. A method for making a carbon nanotube film, the method comprising the following steps:
   (a) providing an array of carbon nanotubes comprising a plurality of carbon nanotubes on a surface of a substrate, wherein each of the plurality of carbon nanotubes is substantially perpendicular to the substrate; and
   (b) applying pressure to the array of carbon nanotubes with a pressure head, along different directions, until substantially all of carbon nanotubes which are located between the substrate and the pressure head are permanently deformed and angled away from their original positions and towards the substrate, wherein the plurality of carbon nanotubes are arranged along different directions after pressing.

12. The method of claim 11, wherein in step (b), the substantially all of carbon nanotubes which are located between the substrate and the pressure head are angled away from their original positions towards the substrate until the substantially all of carbon nanotubes which are located between the substrate and the pressure head are substantially parallel to the surface of the substrate.

13. The method of claim 11, wherein step (a) further comprises the following steps:
providing a substantially flat and smooth substrate;
applying a catalyst layer on the substrate;
annealing the substrate with the catalyst layer in air at a temperature in the approximate range from 700° C. to 900° C. for about 30 to 90 minutes;
heating the substrate with the catalyst layer to a temperature in the approximate range from 500° C. to 740° C. in a furnace with a protective gas therein; and
supplying a carbon source gas to the furnace for about 5 to 30 minutes and growing a super-aligned array of carbon nanotubes on the substrate.

* * * * *